J. ESCHENBRENNER.
COLLAR BUTTON HOOK.
APPLICATION FILED FEB. 11, 1916.
1,197,358.
Patented Sept. 5, 1916.
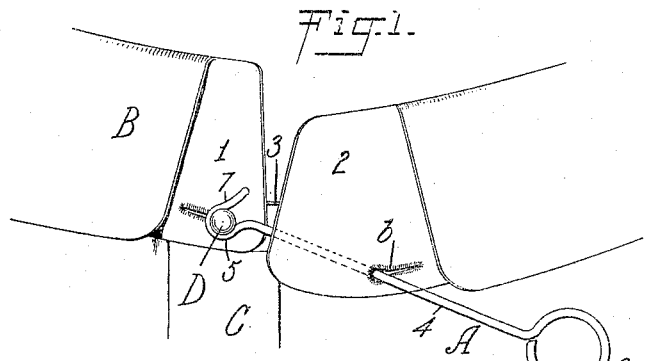
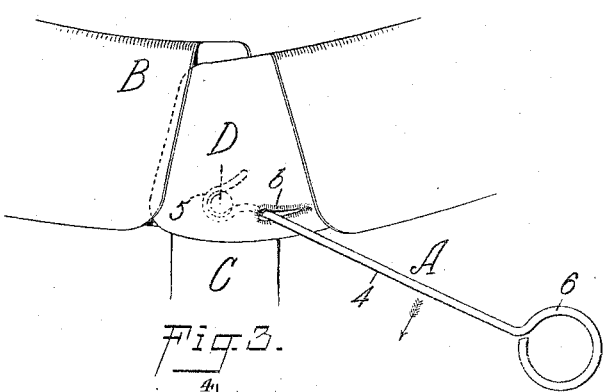
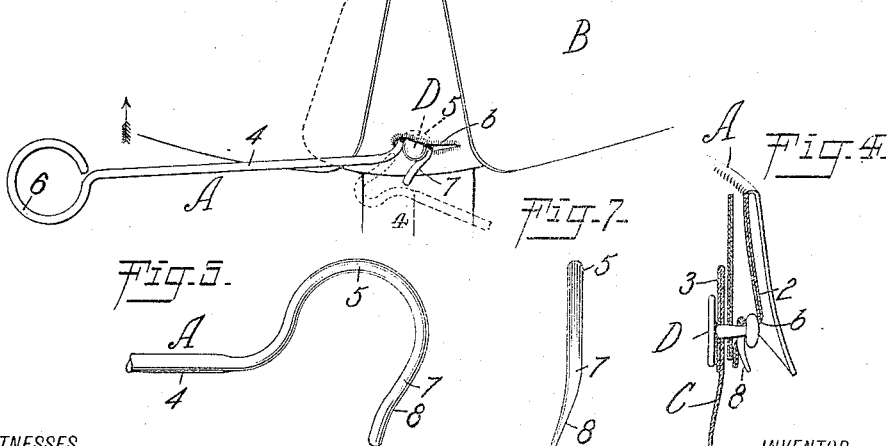
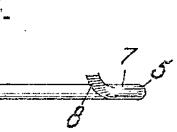
WITNESSES
William P. Goebel.
G. Bradway.
INVENTOR
Joseph Eschenbrenner
BY Munn & Co
ATTORNEYS

UNITED STATES PATENT OFFICE.

JOSEPH ESCHENBRENNER, OF FARMINGDALE, NEW YORK.

COLLAR-BUTTON HOOK.

1,197,358. Specification of Letters Patent. Patented Sept. 5, 1916.

Application filed February 11, 1916. Serial No. 77,619.

*To all whom it may concern:*

Be it known that I, JOSEPH ESCHENBRENNER, a citizen of the United States, and a resident of Farmingdale, in the county of Nassau and State of New York, have invented a new and Improved Collar-Button Hook, of which the following is a full, clear, and exact description.

This invention relates to a buttoning hook especially designed for buttoning collars to the collar band of a shirt.

The invention has for its general objects to improve the construction of buttoning devices of this character so as to be reliable and efficient in use, comparatively simple and inexpensive to manufacture, and so designed that the collar can be easily and quickly buttoned without danger of injuring the collar fabric or the buttonhole, and without danger of soiling the collar.

A more specific object of the invention is the provision of a hook having a special form of bill which insures the easy buttoning of the collar.

With such objects in view, and others which will appear as the description proceeds, the invention comprises various novel features of construction and arrangement of parts such as will be set forth with particularity in the following description and claim appended hereto.

In the accompanying drawing, which illustrates one embodiment of the invention and wherein similar characters of reference indicate corresponding parts in all the views, Figures 1, 2 and 3 are perspective views showing the different steps in the operation of buttoning the second end of a collar to a shirt; Fig. 4 is a vertical section on the line 4—4, Fig. 3; Fig. 5 is an enlarged plan view of the button-engaging portion of the device; Fig. 6 is a side view thereof; and Fig. 7 is an end view.

Referring to the drawing, A designates the collar buttoning hook, B a collar, C a shirt and D the front button for buttoning the ends 1 and 2 of the collar to the shirt collar band 3.

The buttoning device A comprises a shank 4 formed at one end with a hook 5 and at the opposite end with a ring 6, the buttoning device being shown in the present instance as a single piece of wire bent to the desired shape, but it is to be understood that the buttoning device, except as to the shape of the hook 5, may be of any desired construction.

The bill 7 of the hook is extended considerably beyond a line of the shank 4, as shown in Fig. 5, and the free extremity of the bill is bent at an angle to the plane of the major portion of the hook, so that in side view the tip of the bill is considerably above the said plane, as shown in Fig. 6. The under side of the bill has a beveled surface 8; or in other words, the bill is tapered and has a thin rounded extremity, as shown in Fig. 7. As viewed in plan, the bill is a slight compound curve, so that the opening of the hook is formed by a wide mouth.

In using the buttoning device the collar is first buttoned at the rear in the usual manner, and one front end is buttoned to the shirt, and to button the other end of the collar the buttoning device is employed. The hook of the device is inserted through the buttonhole of the free end of the collar and the hook engaged with the head of the collar button, as shown in Fig. 1, the handle of the device being to the left of the button. A swing of the buttoning device down and up toward the right brings the free end of the collar over the end 1, and finally the buttonhole of the free end is engaged over the head of the button, as shown in Figs. 3 and 4. The extremity of the hook is considerably forward of the head of the button, so that it will engage the rear surface of the end 2 of the collar during the swing of the bill around the button as a center. This means that, as soon as the tip of the bill reaches the buttonhole $b$, it will pass forwardly out of the same and slide down on the outside of the collar at the portion below the buttonhole, thus gradually forcing the collar back so that the buttonhole will engage completely over the head of the button. In other words, the beveled surface 8 assists in forcing the collar back under the head of the button, while the tip of the bill of the hook, being out of the plane of the latter, facilitates the easy entrance of the bill into the buttonhole prior to the time the beveled surface 8 comes into action, as explained.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

A collar buttoning device made of wire bent in the form of a straight shank having a hook at one end which is in the same plane with the shank, said hook having the tip of its bill bent out of the plane of the major portion of the hook at an angle of approximately fifteen degrees, and the bill at the side from which it is bent from the plane of the hook being beveled to form a tapering tip, and the bill also being slightly curved in a plane parallel with the hook to present a convex side toward the shank, and the concave side away from the shank.

In testimony whereof I have signed my name to this specification in the presence of two subscribing witnesses.

JOSEPH ESCHENBRENNER.

Witnesses:
WILLIAM H. TROU,
ERNEST HACKWITZ.

Copies of this patent may be obtained for five cents each, by addressing the "Commissioner of Patents, Washington, D. C."